Sept. 28, 1965 R. H. MILLER 3,209,257
MULTISCALE ELECTRIC METER HAVING A SLIDABLE
INDICATOR PLATE POSITIONED BY A
ROTATABLE CAM SHAFT
Filed Sept. 27, 1962
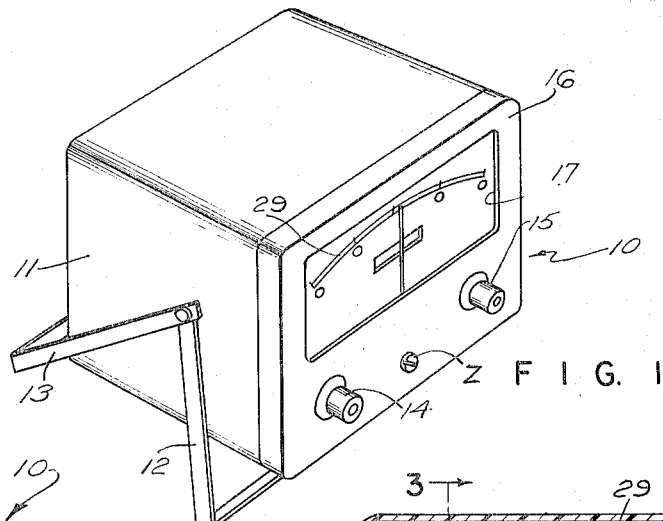
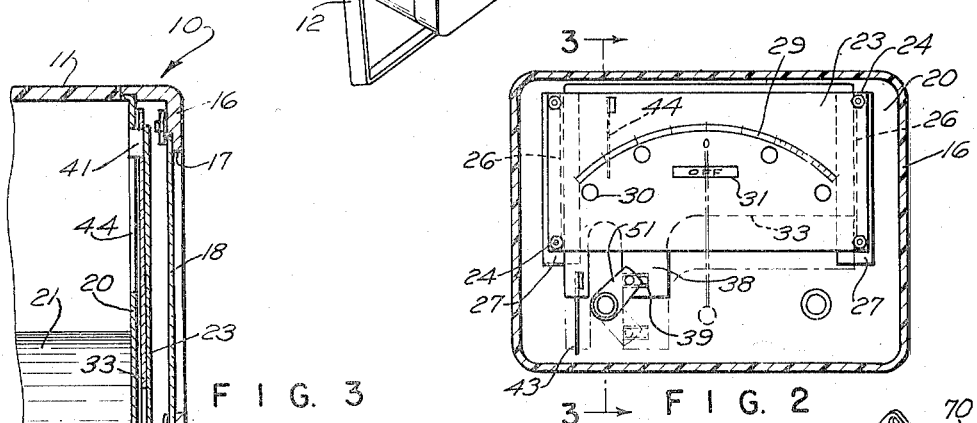
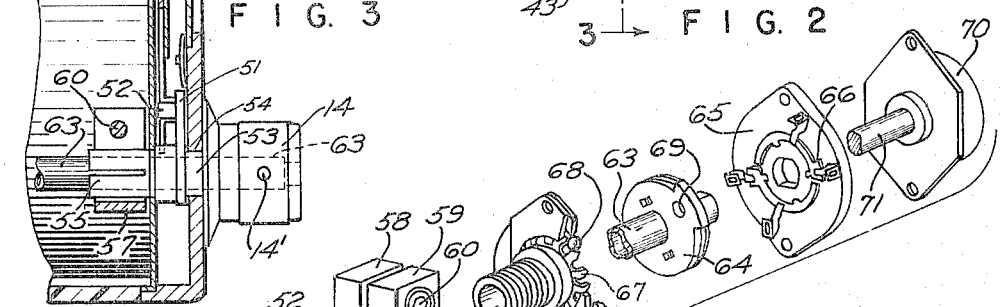
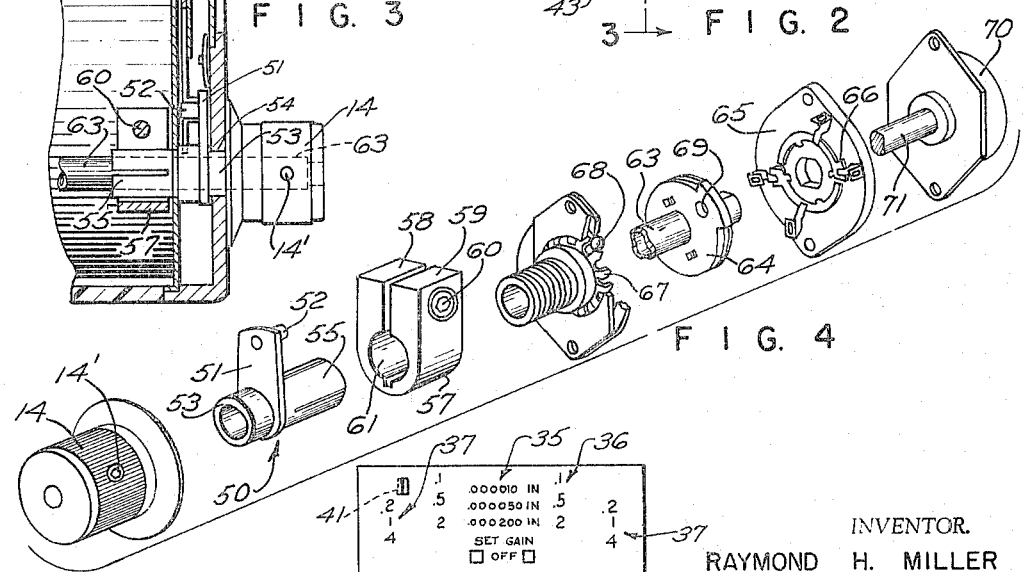
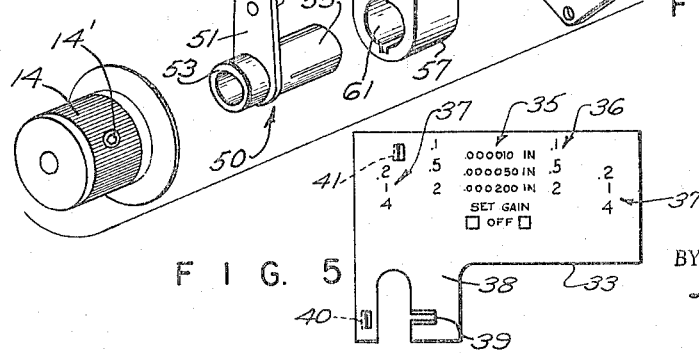
INVENTOR.
RAYMOND H. MILLER
BY
Barlow & Barlow
ATTORNEYS

United States Patent Office 3,209,257
Patented Sept. 28, 1965

3,209,257
MULTISCALE ELECTRIC METER HAVING A SLIDABLE INDICATOR PLATE POSITIONED BY A ROTATABLE CAM SHAFT
Raymond H. Miller, Cranston, R.I., assignor to Federal Products Corporation, a corporation of Rhode Island
Filed Sept. 27, 1962, Ser. No. 226,681
4 Claims. (Cl. 324—115)

This invention relates to changeable range scales for an electric meter movement and more particularly to a mechanism which may be readily assembled and readily synchronized with the electrical range scale change.

It is very desirable that the meter movement in an electrical indicating meter of the D'Arsonval type be maintained substantially dust free. To this end it is usual that if controls pass through a meter case, that they be passed through bushings that are placed in the case that will maintain this substantially dust-tight relationship. If this were not done and dirt and other foreign matter could enter the meter case, it would tend to lodge on the fine hairspring and/or the jewel bearings and impair the accuracy of the meter itself. Accordingly, if one places a changeable exhibitor within a meter case, it is essential that this changeable exhibitor have its shaft passing out of the meter case and that all adjustments in association therewith be outside of the case. It is accordingly a principal object of this invention to provide a changeable exhibitor means for a meter that meets the above criterion.

A further object of the invention is to provide a changeable exhibitor means for a meter movement which will have provision for coaxial mounting with a range switch.

Another object of this invention is to provide a changeable exhibitor construction for a meter movement in which the meter movement is maintained in substantial dust-free relationship.

Another object of this invention is to provide a changeable exhibitor construction for a meter movement in which the meter case need not be opened (with attendant risk of entry of dirt into meter movement) at time of assembly of meter to switch and/or other associated equipment.

With these and other objects in view, the invention consists of certain novel features of construction as will be more fully described and particularly pointed out in the appended claims.

In the drawings:

FIG. 1 is a perspective view of a meter movement mounted in a case which is made in accordance with the instant invention;

FIG. 2 is a sectional view taken through the meter case immediately behind the front cover thereof;

FIG. 3 is a sectional view taken on lines 3—3 of FIG. 2;

FIG. 4 is an exploded view showing the arrangement of the electrical range switch and the mechanical parts for actuating the changeable exhibitor in accordance with the invention; and FIG. 5 is a plan view of the exhibitor scale.

Referring now to the drawings, FIG. 1 shows an electrical instrument having a case 11 for containing some meter movement with an indicating compartment 10 at one end. The instrument is provided with suitable easel type legs 12 and 13 to maintain the indicating compartment in proper viewing position on a table or other work support. A knob 14 projects from the front of the indicating compartment 10 which is used for changing the range of the meter movement and which is also here used to change the range of the indicator, and another knob 15 which can be used for zero setting of the indicator, or for other purposes, may be provided together with the usual D'Arsonval zero mechanical positioner Z. The indicating compartment 10 basically comprises a front wall 16 with a rectangular cutout portion 17 that is covered by transparent glass or plastic 18 and back wall 20 with a rearwardly extending cylindrical portion 21, the latter of which serves to receive the usual magnetic assembly and other parts of the D'Arsonval meter movement.

A scale plate 23 is affixed to the back wall 20 by corner bolts 24 and is held in spaced relationship thereto by spacing strips 26 and 27. The scale plate 23 is provided with suitable scale indicia such as 29 thereon, and these indicia are formed in the usual arcuate path as is common in all D'Arsonval meter movements of the flat face type. Adjacent the major indicia, there are cut apertures as at 30, four such apertures being shown. Actually any number of apertures could be used depending upon the major scale divisions being utilized. Additionally, to indicate the range of the instrument at the time it is being used or other conditions, an information aperture 31, somewhat central of the scale plate is provided.

The exhibitor 33 is in the form of a plate and is adapted to slide between the scale face 23 and the rear wall 20 as is shown more fully in FIGS. 3 and 5 of the drawings. For registration with the aperture 31 a number of indicia such as is shown generally at 35 (FIG. 5) may be provided, and to either side of this central section, other indicia as at 36 and 37 are adapted to register with the apertures 30. The exhibitor 33 is formed with a downwardly projecting portion 38 which has a slot 39 cut therein to receive a pin to actuate the exhibitor relative to the scale plate. Two tabs as at 40 and 41 are bent from the exhibitor 33 and are received in slots cut in the back plate 20 as at 43 and 44 respectively. It will now be apparent, that insofar as the description has proceeded, that various indicia may appear in the aperture's windows 30 and 31 depending upon the position of the changeable exhibitor 33 relative to the scale plate 23.

To effect the actuation of the exhibitor plate 33, a clutch bushing 50 provided extends the front wall 16 and rear wall 20, this clutch bushing having an arm 51 with a pin 52 extending thereon, the pin 52 being adapted to be received in the slot 39 in the exhibitor plate 33. The bushing 50 has a forwardly extending sleeve portion 53 which is received within the aperture 54 of the front wall 16 and a rearwardly projecting split clutch sleeve 55 passing through the rear wall 20. A clamp 57 is received over the split clutch bushing 55 at a location outside the meter compartment and has a pair of split legs 58 and 59 which may be drawn together by a screw 60 so as to effectively reduce the diameter of the bore 61 thereof. In this fashion the portions of the clutch bushing 55 may be squeezed about a shaft that passes therethrough. The shaft that passes through the clutch bushing 55 is a hollow shaft 63 that is used for changing the range of the meter movement in the case 11. It is directly coupled to a switch wafer 66 that is mounted normally on a contact wafer 65 as is well known to those versed in the electrical art. Briefly speaking, the arrangement is such that the switch wafer 66 is adapted to contact one contact at a time as it is rotated, and detent action is provided by the mounting bracket 67 with the usual detent ball 68 riding within an aperture 69 of the detent disc 64. In the particular arrangement shown, the hollow shaft 63 is provided so that a potentiometer such as 70 may have its shaft 71 extend therethrough and on out to the front panel of the instrument.

In the arrangement shown, it will be apparent that the position of the arm 51 may be varied on the shaft 63. This is necessary since the mounting position of the switch assembly consisting principally of the contact wafer 65 may angularly vary. Accordingly, in the assembly operation, proper indexing of the parts may be readily effected by rotating the shaft 63 to the proper contact and then manually rotating the clutch sleeve 55 until the proper indication comes up in the windows 30 and/or 31 whereupon the screw 60 of the clamp 57 may be tightened, giving us an integral assembly. When this has been effected, a knob 14 may be placed on the shaft 63 and held in position by a set screw 14'. It will now be apparent that upon rotation of the knob 14 two things will occur: First, the switch wafer 66 will be rotated and in step therewith the arm 51 will rotate, the pin 52 sliding within the slot 39 and reciprocating the exhibitor 33 in behind the scale plate 23. Should for any reason the synchronism of the exhibitor and the switch get out of step, it is a simple matter to loosen the clutch clamp 57 located outside the indicator compartment and reorient the parts so that they are once again in synchronism. It will further be noted in this construction that the bushing 59 having a bearing fit in the compartment walls provides an effective dust-tight relationship with the front wall 16 as well as the rear plate or wall 20 of the compartment and that all parts are thus once assembled within the indicator compartment in a proper dust-free atmosphere may be substantially maintained in that condition as the guiding slots 43 and 44 may be readily covered on the rear cover 20 of the wall. Thus during assembly of the meter proper to the auxiliary electrical circuitry or associated equipment, the indicator compartment need not be opened with risk of entry of dirt into the meter movement.

I claim:

1. In a multiple range electrical instrument, a case for containing a multi range electric meter movement, an indicating compartment associated therewith and comprising spaced walls, a rotatable shaft extending through said spaced walls for changing the range of said electric meter movement, said meter movement having a movable pointer with the pointer movable in said indicator compartment, a scale plate mounted in said compartment for association with said movable pointer, a slidable exhibitor plate juxtapositioned to said scale plate, a bushing extending between said spaced walls and embracing said shaft with a portion extending through one of said walls, said extending portion being split, means outside of said compartment clamping said split portion to said rotatable shaft, and a radially extending arm carried by said bushing between said walls and connected to said exhibitor plate for sliding the exhibitor plate to correspond with different ranges of an electric meter movement.

2. In an instrument as in claim 1 wherein aperture means are located in said scale plate, said movable exhibitor plate being mounted for slidable relation behind said scale plate with indicia means to associate with the aperture means.

3. In an instrument as in claim 1 wherein said exhibitor plate has a cam slot and said arm has a cam pin cooperating with said slot.

4. In an instrument as in claim 1 wherein said shaft is connected to a multi-position rotatable switch means.

References Cited by the Examiner

UNITED STATES PATENTS

| 2,394,286 | 2/46 | Blaisdell. | |
| 2,558,276 | 6/51 | Simpson et al. | 324—115 |
| 2,657,357 | 10/53 | Rosso | 324—115 X |
| 2,765,764 | 10/56 | Beldt | 116—124.1 |

FOREIGN PATENTS 389,383   4/08   France.

WALTER L. CARLSON, *Primary Examiner.*

RUDOLPH V. ROLINEC, *Examiner.*